(12) United States Patent
Rempel et al.

(10) Patent No.: US 10,407,248 B2
(45) Date of Patent: Sep. 10, 2019

(54) AGRICULTURAL CONVEYOR WITH HYDRAULICALLY ADJUSTED CONVEYOR BELT TENSION AND DRIVE BELT TENSION

(71) Applicant: Kinetic Ag Ltd., Niverville (CA)

(72) Inventors: Jeromy Don Rempel, Niverville (CA);
Randy Dale Martens, Grunthal (CA);
John D. Driedger, Winnipeg (CA)

(*) Notice: Subject to any disclaimer, the term of this patent is extended or adjusted under 35 U.S.C. 154(b) by 0 days.

(21) Appl. No.: 16/142,281

(22) Filed: Sep. 26, 2018

(65) Prior Publication Data
US 2019/0092576 A1 Mar. 28, 2019

Related U.S. Application Data

(60) Provisional application No. 62/564,696, filed on Sep. 28, 2017.

(51) Int. Cl.
*B65G 41/00* (2006.01)
*B65G 23/44* (2006.01)
*B65G 15/60* (2006.01)
*B65G 15/08* (2006.01)

(52) U.S. Cl.
CPC ............. *B65G 41/00* (2013.01); *B65G 15/08* (2013.01); *B65G 15/60* (2013.01); *B65G 23/44* (2013.01); *B65G 41/005* (2013.01)

(58) Field of Classification Search
CPC ............................... B65G 41/00; B65G 23/44
USPC ........................................................ 198/813
See application file for complete search history.

(56) References Cited

U.S. PATENT DOCUMENTS

| 1,254,414 | A | * | 1/1918 | Latnz | B65G 41/002 198/813 |
| 5,246,102 | A | * | 9/1993 | Rappen | B65G 15/08 198/819 |
| 5,498,119 | A | * | 3/1996 | Faivre | B60P 1/36 198/313 |
| 6,349,812 | B1 | * | 2/2002 | Epp | B65G 23/44 198/318 |
| 6,405,855 | B1 | * | 6/2002 | Peltier | B65G 15/08 198/819 |
| 6,695,130 | B1 | * | 2/2004 | Blaylock | B65G 23/44 198/813 |
| 7,909,153 | B2 | * | 3/2011 | Pogue | B65G 21/14 198/312 |

(Continued)

*Primary Examiner* — Mark A Deuble
(74) *Attorney, Agent, or Firm* — Ryan W. Dupuis; Adet Company Inc.; Kyle R. Satterthwaite

(57) ABSTRACT

A hydraulic actuator is provided within a belt-type agricultural conveyor for controlling the position of the tension roller of the conveyor belt, together with a hydraulic controller which supplies a controlled pressure of hydraulic fluid to the hydraulic actuator. In this manner, a consistent tension can be applied to the endless conveyor belt in an automated manner through a large range of movement so that the maintenance step of periodically removing a section of the belt as the belt stretches can be minimized in frequency. Furthermore, the endless belt is always operated at an optimum tension for extending the life of the belt. The hydraulic actuator also enables the tension to be removed from the belt in a simple manner by displacing a switch to remove tension from the belt whenever the conveyor is not in use for yet further extending the life of the conveyor belt.

18 Claims, 8 Drawing Sheets

(56) References Cited

U.S. PATENT DOCUMENTS

| | | | | |
|---|---|---|---|---|
| 8,770,390 B2* | 7/2014 | Neufeld | ................ | B65G 21/14 |
| | | | | 198/812 |
| 10,112,775 B2* | 10/2018 | Hanel | .................... | B65G 15/08 |
| 2018/0037428 A1* | 2/2018 | Ito | ........................ | B65G 23/44 |
| 2018/0186576 A1* | 7/2018 | Torrenga | ............... | B65G 21/06 |
| 2018/0305132 A1* | 10/2018 | Watson | ................ | B65G 23/44 |

* cited by examiner

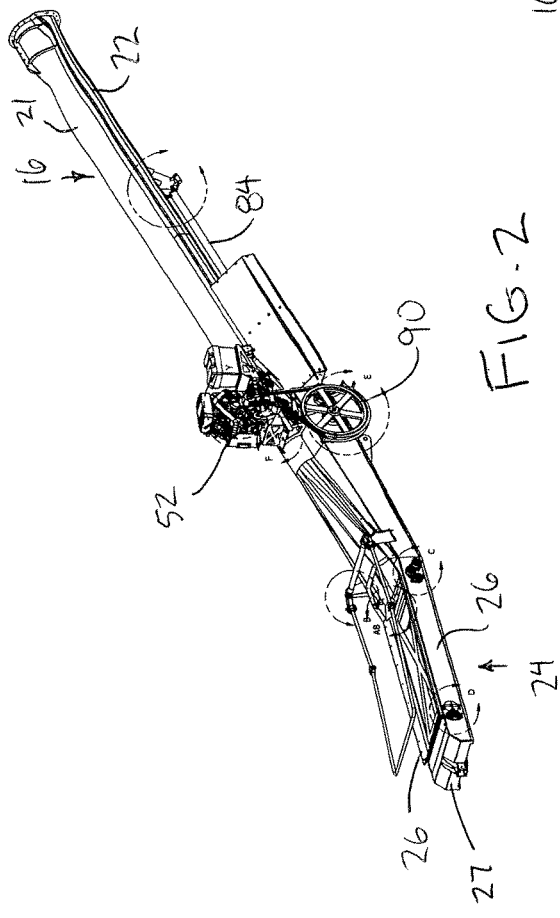
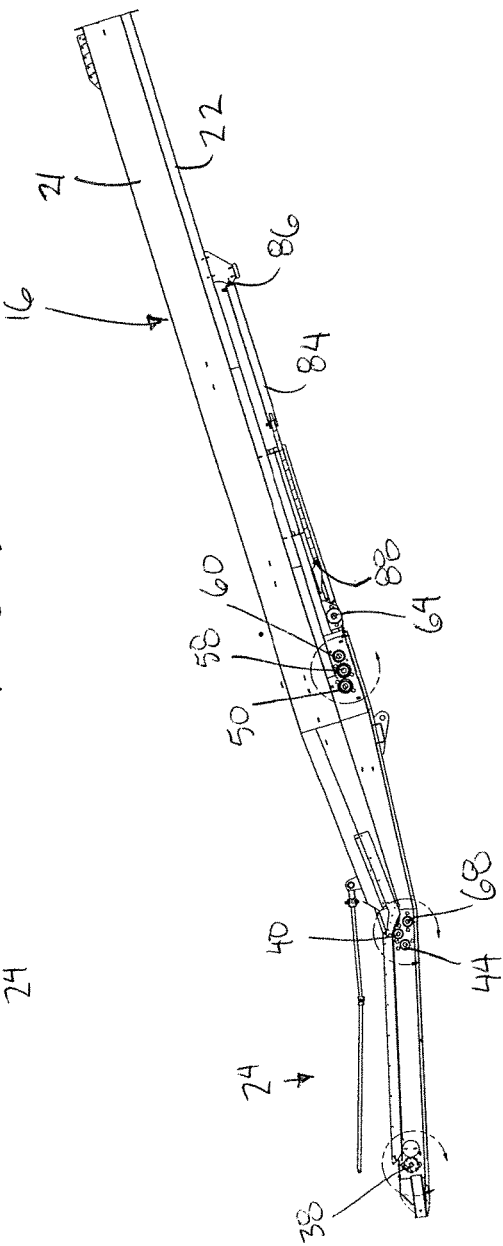
FIG. 2
FIG. 3

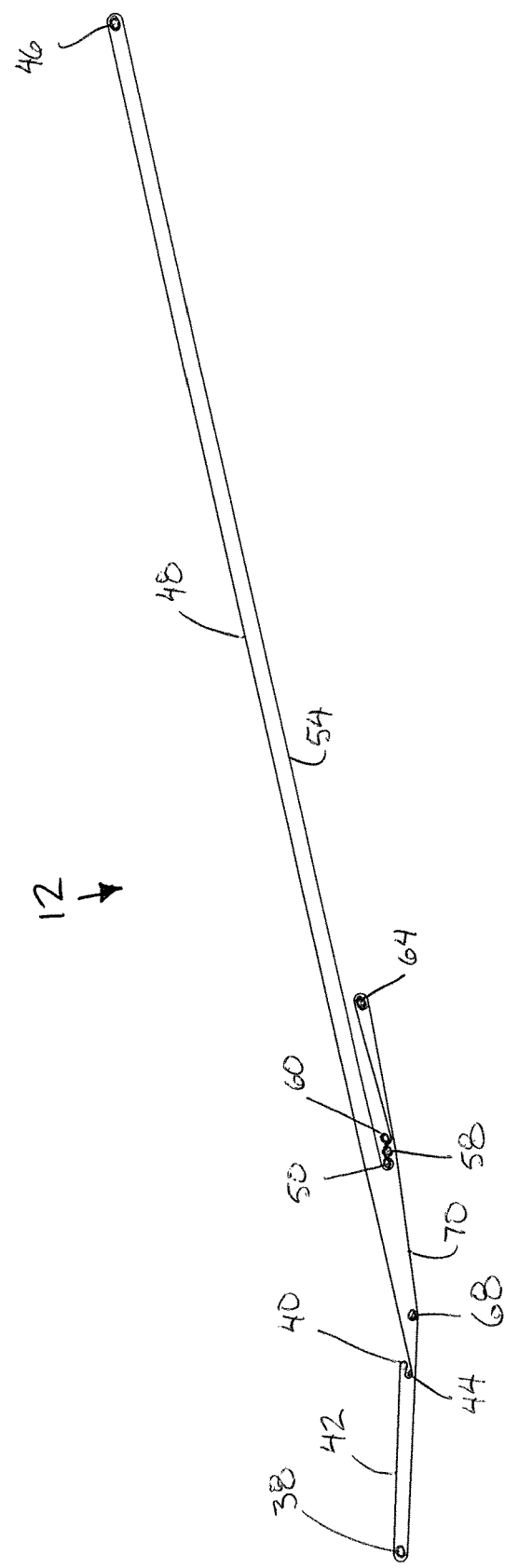

AGRICULTURAL CONVEYOR WITH HYDRAULICALLY ADJUSTED CONVEYOR BELT TENSION AND DRIVE BELT TENSION

This application claims the benefit under 35 U.S.C. 119(e) of U.S. provisional application Ser. No. 62/564,696, filed Sep. 28, 2017.

FIELD OF THE INVENTION

The present invention relates to an agricultural belt conveyor including a housing having an elongate tube portion and an endless conveyor belt supported on rollers in which one of the rollers is a drive roller driven to rotate by a motor to convey material through the elongate tube portion from an inlet to an outlet of the tube portion. More particularly the present invention relates to an agricultural belt conveyor in which a hydraulic actuator is used to apply belt tension to one or both of (i) the endless conveyor belt and (ii) a drive belt communicating drive from motor to the drive roller.

BACKGROUND

One commonly available type of agricultural conveyor for conveying particulate materials uses an endless conveyor belt having an upper run extending longitudinally through a conveyor tube that is supported to extend at an upward slope from a pickup housing at an inlet end of the tube to a discharge spout at an outlet end of the tube. With use, the conveyor belt tends to stretch which reduces tension on the belt and results in slippage of the belt relative to drive rollers. To accommodate for the stretch, the belt path commonly passes around a tension roller which can be adjustably positioned relative to the frame for varying the overall length of the belt path. The tension roller is commonly supported using springs and threaded mounts. These springs result in an uneven belt tension throughout the range of extension of the springs, whereas the threaded mounts are typically quite limited in range. Each time the limited range of movement of the tension roller is exceeded by the stretch in the conveyor belt, a section of the conveyor belt must be cut out which results in time consuming and costly maintenance.

The endless conveyor belt is typically driven to rotate by connecting a motor to one of the rollers supporting the endless conveyor belt thereon. Typically, the drive transmission between the motor and the drive roller results in a quick and sudden acceleration of the drive roller from a static position to the operating speed resulting in slippage and wear of the endless conveyor belt relative to the driver roller upon each start up. This wear on the endless conveyor belt also shortens the lifespan of the endless conveyor belt.

SUMMARY OF THE INVENTION

According to one aspect of the invention there is provided an agricultural conveyor comprising:

a main frame supported on wheels for rolling movement across a ground surface;

a housing supported on the main frame, the housing including (i) a tube portion extending in a longitudinal direction at an upward slope from an inlet end of the tube portion to an outlet end of the tube portion and (ii) a pickup portion connected to the inlet end having an open top end;

an endless conveyor belt received within the housing to define an upper run of the endless conveyor belt and a lower run of the endless conveyor belt below the upper run;

a belt positioning assembly supporting the endless conveyor belt to convey material from the open top end of the pickup portion of the housing to the outlet end of the tube portion of the housing, the belt positioning assembly comprising:

(i) pickup rollers supported in the pickup portion of the housing;

(ii) conveyor rollers supported at opposing ends of the tube portion of the housing;

(iii) an upper intermediate roller supported below the upper run of the endless conveyor belt so as to be positioned between the inlet end and the outlet end of the tube portion in the longitudinal direction; and (iv) a lower intermediate roller supported below the upper run of the endless convey so as to be positioned between the inlet end of the tube portion and the upper intermediate roller in the longitudinal direction;

the upper run of the endless conveyor belt comprising a first upper belt portion spanning below the open top end between the pickup rollers within the pickup portion of the housing and a second upper belt portion extending through the tube portion of the housing from the inlet end to the outlet end between the conveyor rollers;

the lower run of the endless conveyor belt comprising a first lower belt portion extending from the outlet end of the tube portion to the lower intermediate roller, a second lower belt portion extending between the lower intermediate roller and the upper intermediate roller, and a third lower belt portion extending from the upper intermediate roller to the pickup rollers within the pickup portion of the housing;

the belt positioning assembly further comprising a track on the tube portion of the housing extending in the longitudinal direction of the tube portion and a carriage mounted on the track so as to be slidable along the track in the longitudinal direction of the tube portion;

one of the upper intermediate roller and the lower intermediate roller comprising a fixed roller being fixed in position relative to the tube portion of the housing;

one of the upper intermediate roller and the lower intermediate roller comprising a tensioning roller supported on the carriage so as to be movable with the carriage in the longitudinal direction relative to the tube portion of the housing;

a hydraulic linear actuator operatively connected between the housing and the carriage such that extension and contraction of the hydraulic linear actuator displaces the tension roller on the carriage relative to the housing so as to vary a length of a path of the endless conveyor belt defined by the belt positioning system; and a hydraulic controller operatively connected to the hydraulic linear actuator so as to be arranged to supply a controlled pressure of hydraulic fluid to the hydraulic linear actuator corresponding to a prescribed tension of the endless conveyor belt.

Use of a hydraulic actuator for controlling the position of the tension roller, together with a hydraulic controller which supplies a controlled pressure of hydraulic fluid to the hydraulic actuator, a consistent tension can be applied to the endless conveyor belt in an automated manner through a large range of movement so that the maintenance step of periodically removing a section of the belt as the belt stretches can be minimized in frequency. Furthermore, the endless belt is always operated at an optimum tension for extending the life of the belt. The hydraulic actuator also enables the tension to be removed from the belt in a simple manner by simply displacing a switch to remove tension from the belt whenever the conveyor is not in use for yet further extending the life of the conveyor belt.

Preferably the hydraulic linear actuator is parallel to and lies in a common vertical plane with the longitudinal direction of the tube portion of the housing.

Preferably the controller pressure of the hydraulic controller is controllably adjustable.

Preferably a hydraulic switch is operatively connected to the hydraulic linear actuator to be operable between a working position in which the hydraulic linear actuator is supplied with hydraulic fluid at the controlled pressure of the hydraulic controller and a storage position in which the hydraulic linear actuator is isolated from the controlled pressure of the hydraulic controller corresponding to a release of the prescribed tension on the endless conveyor belt.

Preferably the lower intermediate roller is the fixed roller and the upper intermediate roller is the tensioning roller. In this instance, the hydraulic linear actuator may be mounted between the upper intermediate roller and the outlet end of the tube portion of the housing such that contraction of the hydraulic linear actuator increases tension on the endless conveyor belt.

Preferably one of the rollers comprises a drive roller which is operatively connected which is operatively connected to a drive motor so as to drive rotation of the endless conveyor belt about the rollers. In this instance, the fixed roller may be the drive roller. Preferably the conveyor in this instance further comprises: (i) a drive pulley may be connected to the drive roller for rotation together about an axis of the drive roller, (ii) a drive belt coupled between a rotary output of the drive motor and the drive pulley to transfer rotation from the rotary output of the drive motor to the drive roller connected to the drive pulley, (iii) a tension wheel engaging the drive belt and supported on the housing so as to be movable relative to the housing to vary tension applied to the drive belt, and (iv) a hydraulic tension actuator operatively connected between the housing and the tension wheel so as to be arranged to controllably adjust the tension applied to the drive belt.

The hydraulic controller may be operatively connected to both the hydraulic linear actuator that is operatively connected to the endless conveyor belt and the hydraulic tension actuator that is operatively connected to the drive belt such that the prescribed tension of the endless conveyor belt is proportional to the tension applied to the drive belt.

Preferably the hydraulic controller includes a pressure reducing valve and wherein both the hydraulic linear actuator and the hydraulic tension actuator are connected downstream of said pressure reducing valve.

The track may comprise two elongated channel members parallel to the longitudinal direction of the tube portion and spaced laterally apart from one another, in which the carriage spans between the channel members such that opposing side edges of the carriage are received within the elongated channel members respectively so as to be slidable in the longitudinal direction of the tube portion of the housing.

Preferably each elongated channel member is U-shaped in cross section, having an open side facing laterally inwardly towards the other channel member.

Preferably each side edge of the carriage includes a pair of sliding members which are spaced apart in the longitudinal direction and which are formed of a sliding material having a low coefficient of friction.

Preferably each side edge of the carriage includes a pair of sliding members defining opposing top and bottom sliding surfaces that are parallel to one another and which are in sliding contact with respective surfaces on the track.

According to a second aspect of the present invention there is provided an agricultural conveyor comprising:
a main frame supported on wheels for rolling movement across a ground surface;
a housing supported on the main frame, the housing including (i) a tube portion extending in a longitudinal direction at an upward slope from an inlet end of the tube portion to an outlet end of the tube portion and (ii) a pickup portion connected to the inlet end having an open top end;
an endless conveyor belt received within the housing to define an upper run of the endless conveyor belt and a lower run of the endless conveyor belt below the upper run;
a belt positioning assembly comprising a plurality of conveyor rollers supporting the endless conveyor belt to convey material from the open top end of the pickup portion of the housing to the outlet end of the tube portion of the housing;
a drive motor having a rotary output;
one of the conveyor rollers comprising a drive roller;
a drive pulley connected to the drive roller for rotation together about an axis of the drive roller;
a drive belt coupled between the rotary output of the drive motor and the drive pulley to transfer rotation from the rotary output of the drive motor to the drive roller connected to the drive pulley;
a tension wheel engaging the drive belt and supported on the housing so as to be movable relative to the housing to vary tension applied to the drive belt;
a hydraulic tension actuator operatively connected between the housing and the tension wheel such that extension and contraction of the hydraulic tension actuator displaces the tension wheel to vary a length of a path of the drive belt; and
a hydraulic controller operatively connected to the hydraulic tension actuator so as to be arranged to supply a controlled pressure of hydraulic fluid to the hydraulic linear actuator corresponding to a prescribed tension of the drive belt.

Use of a hydraulic actuator to control the position of a tension wheel within the drive transmission between a drive motor and the drive roller allows the motor to start up with the tension wheel in a disengaged position with minimal tension on the drive belt. Hydraulically engaging the tension wheel into an engage position with the drive belt provides a sufficiently gradual introduction of tension into the drive belt that some slippage of the drive belt is expected to occur. This slippage of the drive belt results in a more gradual transition of the drive roller from a static position to the normal operating speed, resulting in a more gradual starting up of the endless conveyor belt rotation with minimum slippage between the drive roller and the endless conveyor belt. In this manner, the majority of the wear on any belts resulting from the rapid acceleration at start up occurs mainly on the drive belt rather than between the drive roller and the conveyor belt. This is beneficial as the drive belt is much cheaper and easier to replace than the endless conveyor belt.

Preferably a hydraulic switch is operatively connected to the hydraulic tension actuator between a working position in which the hydraulic tension actuator is supplied with hydraulic fluid at the controlled pressure of the hydraulic controller to cause the hydraulic tension actuator to apply tension to the drive belt and an idle position corresponding to a release of the prescribed tension on the drive belt.

Preferably a tension crank is pivotally supported at a fixed pivot location on the housing, in which the tension wheel is rotatably supported on the tension crank at a location spaced from the fixed pivot location, and the hydraulic tension actuator is pivotally coupled to the tension crank at a location spaced from the fixed pivot location such that extension and contraction of the hydraulic tension actuator pivots the tension crank to displace the tension wheel and vary a length of a path of the drive belt.

When one of the conveyor rollers is a tension roller, a hydraulic linear actuator may be operatively connected between the housing and the tension roller such that extension and contraction of the hydraulic linear actuator displaces the tension roller on the carriage relative to the housing such that a pressure of the hydraulic linear actuator corresponds to a prescribed tension of the endless conveyor belt.

According to the preferred embodiment, the hydraulic controller is operatively connected to both the hydraulic linear actuator that controller tension of the endless conveyor belt and the hydraulic tension actuator that controls tension of the drive belt such that the prescribed tension of the endless conveyor belt is proportional to the tension applied to the drive belt, and the hydraulic controller includes a pressure reducing valve in which both the hydraulic linear actuator and the hydraulic tension actuator are connected downstream of said pressure reducing valve.

BRIEF DESCRIPTION OF THE DRAWINGS

One embodiment of the invention will now be described in conjunction with the accompanying drawings in which:

FIG. 2 is a perspective view of the inlet end of the conveyor with some components shown removed for illustrative purposes.

FIG. 3 is a partly sectional side elevational view of the inlet end of the conveyor.

FIG. 9 is a side elevational representation of the belt path of the endless conveyor belt.

In the drawings like characters of reference indicate corresponding parts in the different figures.

DETAILED DESCRIPTION

Figure 1:
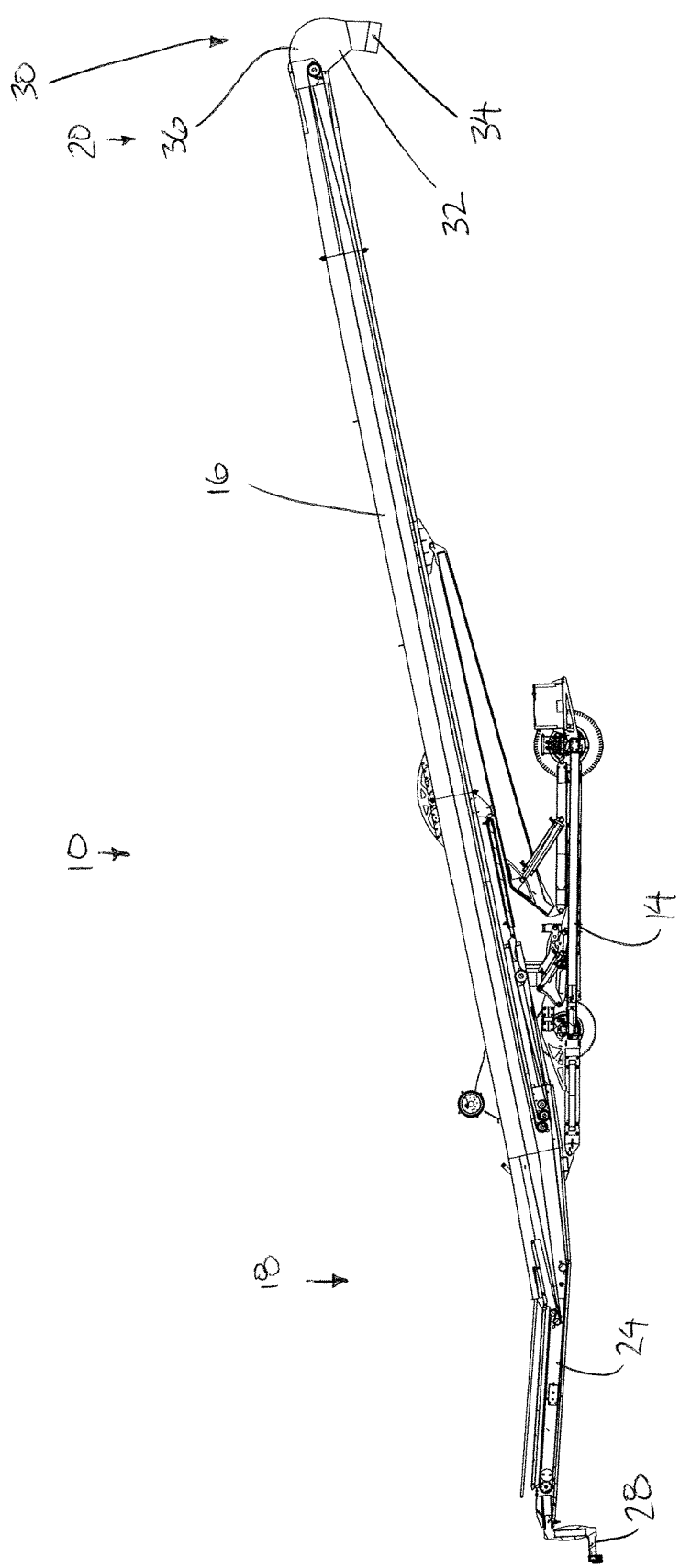
FIG. 1 is a side elevational view of the overall agricultural conveyor.
Figure 4:
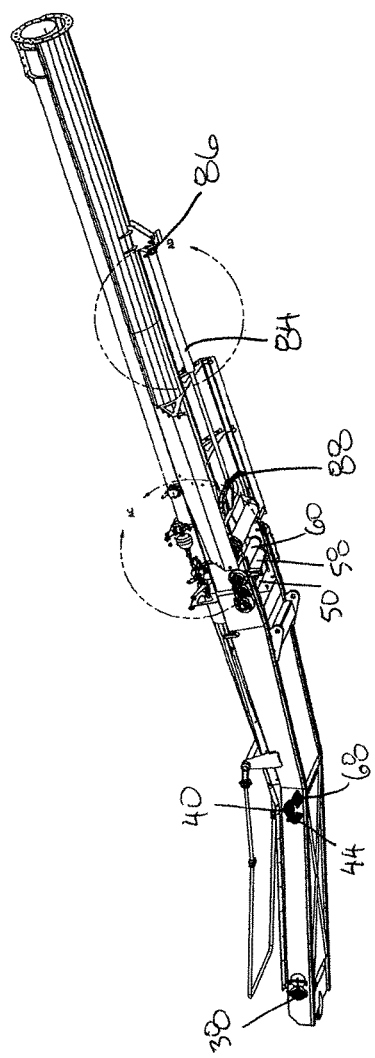
FIG. 4 is a perspective view of a bottom side of the inlet end of the conveyor with some components shown removed for illustrative purposes.
Figure 5:
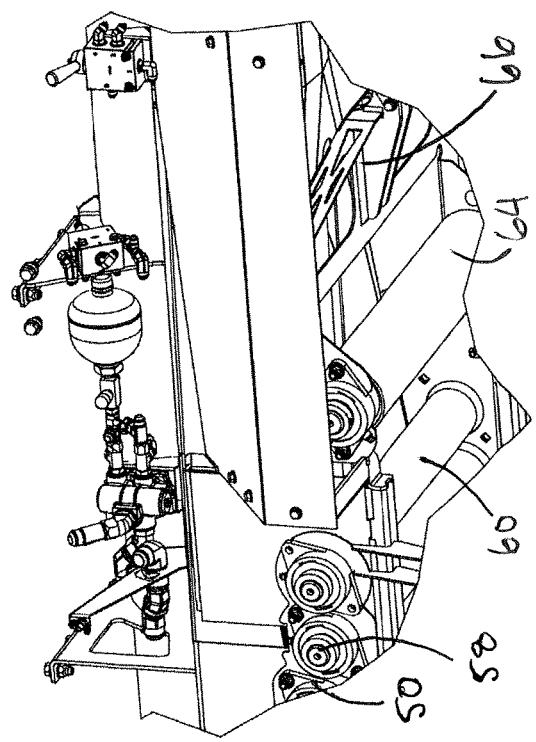
FIG. 5 is an enlarged view of a portion of the view of FIG. 4.
Figure 8:
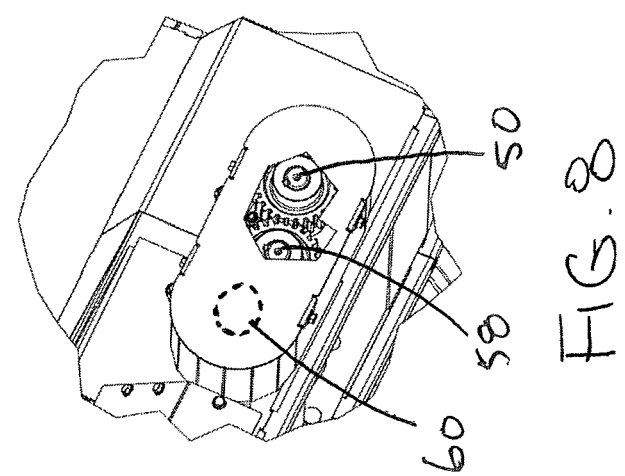
FIG. 8 is a perspective view of a transmission between the drive rollers at the opposite side of the conveyor relative to FIG. 7.
Figure 7:
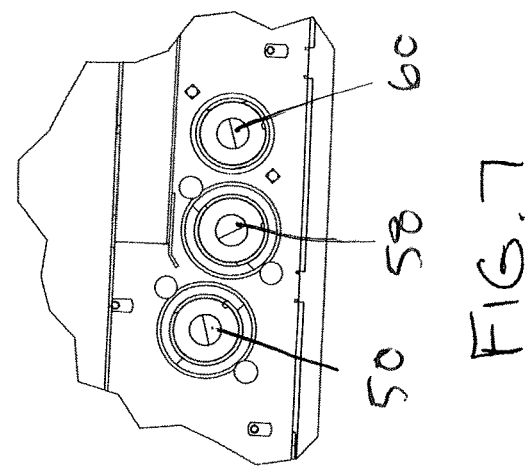
FIG. 7 is a side elevational view of the drive rollers.
Figure 6:
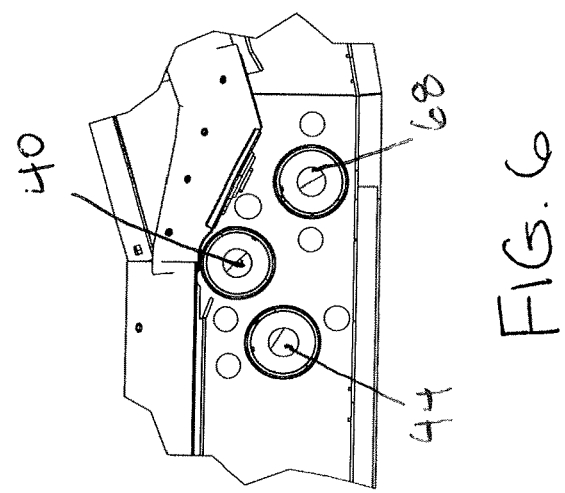
FIG. 6 is a side elevational view of the rollers at the intersection of the pickup portion and the tube portion of the housing of the conveyor.
Figure 10:
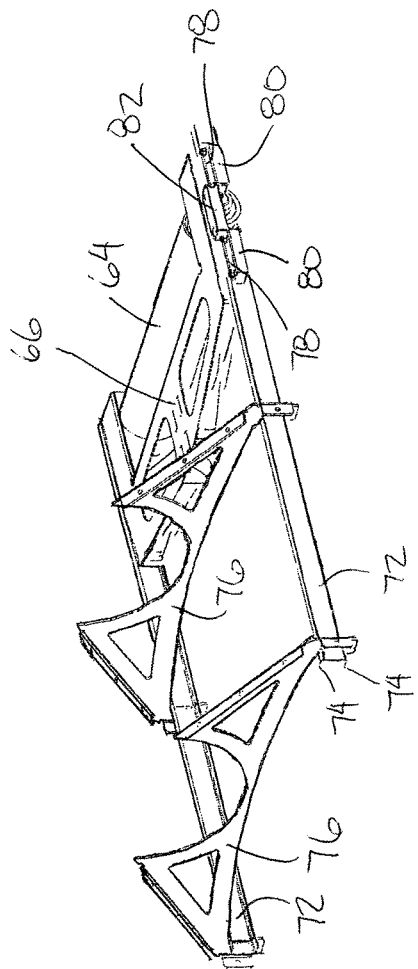
FIG. 10 is a perspective view of the carriage supporting the tension roller on the track of the conveyor.
Figure 12:
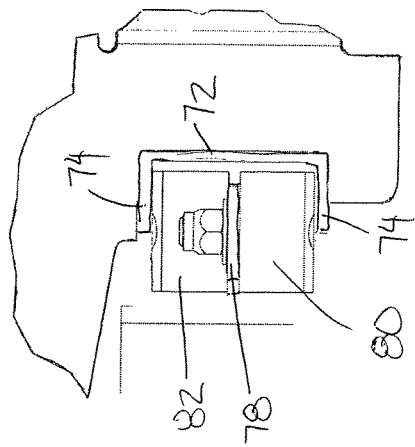
FIG. 12 is an enlarged view of a portion of the view of FIG. 11.
Figure 11:
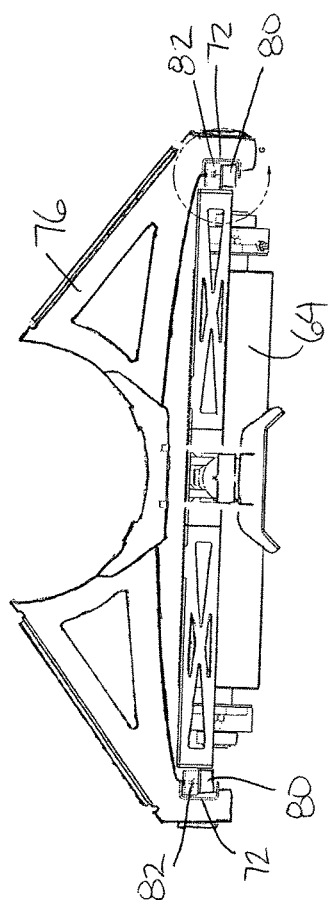
FIG. 11 is an end elevational view of the track supporting the carriage and the tension roller thereon.
Figure 14:
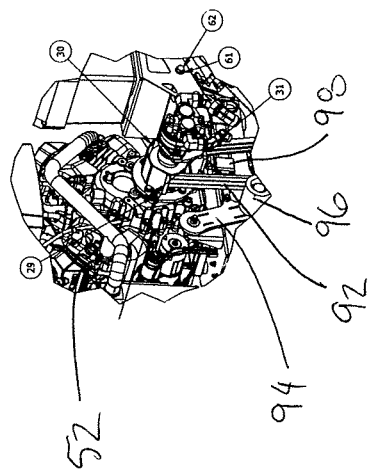
FIG. 14 is a perspective view of the drive transmission shown in FIG. 13.
Figure 13:
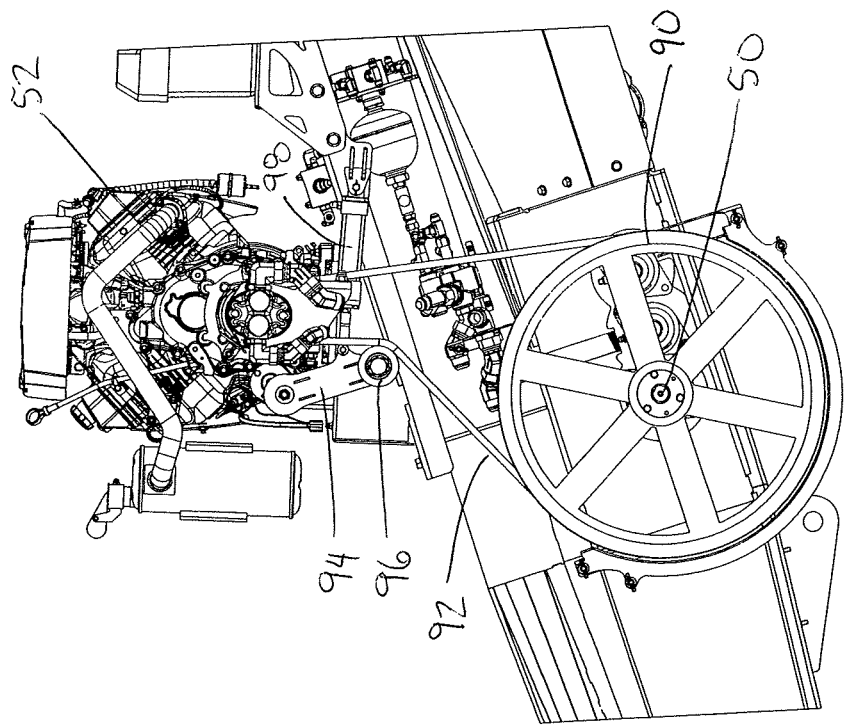
FIG. 13 is a side elevational view of the drive transmission connecting the rotary output of the drive motor to the drive roller of the endless conveyor belt.

Referring to the accompanying figures, there is provided an agricultural belt conveyor generally indicated by reference numeral 10. The conveyor 10 has an endless conveyor belt 12 for conveying particular agricultural materials from an inlet end to a discharge end which is elevated and spaced longitudinally from the inlet end.

The conveyor 10 includes a main frame 14 supported on a set of wheels for rolling movement across a ground surface in a longitudinal rolling direction of the conveyor.

A housing is supported on the main frame 14 of the conveyor which includes a tube portion 16 which is elongate in a longitudinal direction from an inlet at a first end 18 to an outlet at a second end 20. The tube portion 16 includes a cylindrical wall 21 defining a main passage of circular cross-section extending the full length of the tube portion of the housing between the first and second ends thereof. The main passage receives an upper run of the endless conveyor belt 12. A semicircular wall 22 is mounted below the cylindrical wall 21 along a portion of the length of the main passage to define a generally semicircular shaped return passage along the bottom side of the main passage which receives a portion of the lower run of the conveyor belt 12 therein.

The housing also includes a pickup portion 24 which is connected in fixed relation to the first end of the tube portion 16. The pickup portion is a generally flat rectangular shaped box having two parallel and spaced apart side walls 26 at opposing sides and a front end wall 27 at the front end. The walls extend upwardly from a bottom end to an open top end accepting particulate materials to be loaded into the conveyor therethrough. A plane of the opening is angularly offset from the longitudinal direction of the tube such that the pickup portion may be positioned in a near horizontal orientation when the tube portion extends at an upward incline from the pickup portion at a greater inclination from horizontal ground than the pickup portion. An opening is provided at the inner end of the pickup portion for communication with the hollow interior of the main passage.

A hitch coupling 28 is supported on the outer end of the pickup portion opposite from the tube portion of the housing for connection to a towing vehicle. The housing is supported for angular adjustment relative to the main frame 14 that is supported on the wheels such that the tube portion of the auger can be lowered to a more horizontal orientation for transport if desired.

The housing further includes a discharge portion 30 comprised of a hopper 32 located below the outlet end of the tube portion 16 for collecting materials conveyed through the tube portion. The hopper feeds downwardly through a spout 34. An enclosure 36 surrounds the connection between the top end of the hopper 32 and the outlet end of the tube portion of the housing.

A plurality of rollers supported the endless conveyor belt 12 within the housing so that rotation of the conveyor belt about the rollers serves to (i) collect particulate material deposited through the open top end of the pickup portion, (ii) convey the particulate material through the tube portion from the inlet end to the outlet end thereof, and (iii) discharge material deposited from the outlet end of the conveyor belt through the spout of the discharge portion 30 of the housing.

The rollers include a first pickup roller 38 supported at the outermost end of the pickup portion corresponding to the inlet end of the overall conveyor 10. A second pickup roller 40 is supported at the inner end of the pickup portion of the housing at a location parallel and spaced apart from the first pickup roller to support a first upper belt portion 42 of the belt 12 spanning across the pickup portion of the housing below the open top end thereof overtop of the first and second pickup rollers.

A first conveyor roller 44 is supported below the second pickup roller 40 at the inner end of the pickup portion of the housing. The first conveyor roller 44 is closer to the first pickup roller 38 at the inlet end of the conveyor than the second pickup roller so as to guide the belt to be wrapped 180° or more about the second pickup roller, followed by being wrapped about 180° or more of the first conveyor roller before extending upwardly through the main passage in the tube portion of the housing. A second conveyor roller 46 functioning as a head roller is mounted at the outlet end of the tube portion of the housing so as to support a second upper belt portion 48 of the conveyor belt spanning between the first and second conveyor rollers along the full length of the main passage of the tube portion of the housing.

The wall 22 defining the return passage terminates at a bottom and at a location spaced from the inlet end of the tube portion to provide space between the return passage and the pickup portion of the housing to accommodate for portions of a tensioning mechanism of the belt described in further detail below.

The tensioning mechanism includes a lower intermediate roller 50 supported below the main passage at a fixed location relative to the housing so as to be spaced from both the return passage thereabove and the pickup portion of the housing therebelow. In the illustrated embodiment, the lower intermediate roller 50 is a drive roller forming a connection to a motor described in further detail below for driving rotation of the belt conveyor through the housing. The endless belt extends 180° about the second conveyor roller 46 at the outlet end of the tube portion of the housing and then extends along a first lower belt portion 54 of the lower run of the conveyor belt from the second conveyor roller 46 to the lower intermediate roller 50. The endless belt then passes over top of the lower intermediate roller 50 and subsequently wraps more than 180° about the lower intermediate roller to return upwardly towards the discharge end of the conveyor at a second lower belt portion 56 of the lower run of the conveyor belt 12 described further below.

To increase the friction of the belt relative to the drive roller, an optional auxiliary roller 58 may be provided in close proximity to the lower intermediate roller 50 at a location which is upward and towards the discharge end relative to the bottom edge of the lower intermediate roller to encourage the endless belt to wrap more than 180° about the lower intermediate roller 50. Furthermore, a second auxiliary roller 60 may be located in close proximity to the first auxiliary roller 58 to increase the amount that the endless belt wraps over top of the first auxiliary roller 60 along the second lower belt portion 56 of the lower run of the endless belt.

A gearbox 62 may be mounted between the lower intermediate roller 50 and one or both of the first auxiliary roller 58 and the second auxiliary roller 60 at an opposing side relative to the connection of the motor 52 to the lower intermediate roller 50 so that the driven rotation of the lower intermediate roller 50 also drive rotation of the auxiliary rollers to increase the frictional drive between the drive input and the conveyor belt if desired.

The tensioning assembly further includes an upper intermediate roller 64 mounted longitudinally between the lower intermediate roller 50 and the outlet end of the tube portion of the housing at a location below the main passage. The upper intermediate roller may be positioned closer to the outlet end of the tube portion of the housing than a bottom end of the semicircular wall 22 forming the return passage. The upper intermediate roller 64 is mounted on a carriage frame 66 so as to be slidable along a track fixed on the housing for movement of the upper intermediate roller in the longitudinal direction of the tube portion of the housing. The upper intermediate roller is closer to the discharge end of the conveyor than the lower intermediate roller but is movable relative to the housing so as to vary the distance between the upper and lower intermediate rollers. The second lower belt portion 56 of the lower run of the belt 12 extends between the lower intermediate roller 50 and the upper intermediate roller 64 for wrapping more than 180° about the upper intermediate roller 64.

A lower pickup roller 58 is supported at the junction of the pickup portion of the housing and the two portion of the housing below the second pickup roller 40 and the first conveyor roller 44. The lower pickup roller 68 serves to support a third lower belt portion 70 of the lower run of the belt 12 extending from the upper intermediate roller 64 to the lower pickup roller 68 and from the lower pickup roller 68 to the first pickup roller 38. The belt then extends approximately 180° about the first pickup roller before transitioning the first upper belt portion 42 of the belt described above.

An input drive from the motor 52 to the lower intermediate roller 50 drives rotation of the belt along a conveyor belt path defined by the rollers collectively forming a belt positioning assembly of the conveyor. By moving the upper intermediate roller 64 relative to the lower intermediate roller, the overall length of the conveyor belt path is varied which in turn varies the tension of the endless belt 12.

The track which supports the carriage frame 66 comprises two generally U-shaped channels 72 which are mounted parallel to one another and spaced apart from one another at laterally opposing sides of the tube portion of the housing at an intermediate location along the housing between the pickup portion and the return passage thereof. Each U-shaped channel 72 includes a crown at the outer side thereof and two side flanges 74 extending laterally inwardly towards the opposing channel from respective top and bottom edges of the crown of the channel. In this manner, the open sides of the two channels 72 face inwardly towards one another while the channels are symmetrical with one another about a vertical plane containing a longitudinal axis of the tube portion of the housing. The lower end of the channel is located in close proximity to the lower intermediate roller 50 functioning as the drive roller, whereas the upper ends of the channels are spaced longitudinally partway towards the discharge end of the housing relative to the lower end.

Two truss members 76, that are oriented generally perpendicularly to the longitudinal direction of the tube portion of the housing, are mounted at longitudinally spaced positions between the bottom side of the two portion of the housing and the two channels 72 forming the tracks respectively for supporting the channels in fixed relation to the housing.

The carriage frame 66 also comprises a truss member which is generally planar in shape, in which the carriage frame is generally in a common plane with the longitudinal axis of the two channels 72. The truss includes two opposing side edges which are parallel and spaced apart from one another for being received within the two channels 72 respectively. Each side of the truss includes a set of mounting flanges 78 with fastener apertures therein for supporting sliding members in fastened connection thereto. The sliding members are formed of a plastic material having a low coefficient of friction, for example ultra high molecular weight polyethylene (UMHWPE).

More particularly, each side of the carriage frame includes two lower sliding members 80 mounted at longitudinally spaced positions on the mounting flanges of the truss frame. The lower surfaces of the two sliding members 80 lie in a common plane to define a common lower surface in flat engagement with the lowermost side flange 74 of the respective channel 72.

Each side of the carriage frame also includes one upper sliding member 82 at a location which is longitudinally received between the two lower sliding members and which includes an upper surface which is parallel and spaced above the lower surfaces of the lower sliding members. The upper surface is spaced from the lower surfaces by a distance corresponding to the interior dimension between the side flanges of the respective channels 72 such that the upper surface is in sliding contact with the uppermost one of the side flanges 74. The outer side surfaces of the two lower sliding members 80 and the upper sliding member 82 at a common side of the carriage frame lie in a common plane spaced apart from the common plane of the side surfaces at the other side of the carriage frame by a distance corresponding to the internal dimension between the crowns at the outer sides of the two channels 72 respectively. In this manner, the sliding members that define the opposing side edges of the carriage frame are snuggly engaged with the inner surfaces of all three sides of each U-shaped channel in a manner which maintains square alignment of the carriage frame relative to the track throughout sliding movement of the carriage frame along the track.

A hydraulic linear actuator 84 is supported below the tube portion of the housing having an axis which is parallel to the longitudinal axis of the tube portion of the housing. More particularly the actuator is mounted below the return passage. The actuator includes a piston end which extends and retracts relative to the cylinder end to vary the overall length of the actuator in the longitudinal direction thereof. The cylinder end 86 of the actuator is pivotally supported on a bracket at a fixed location closer to the discharge end of the housing than the carriage frame. The opposing piston end 88 of the actuator is mounted on the carriage frame at a laterally centred location relative to the two tracks. In this manner extending the actuator causes the upper intermediate roller 64 to be displaced closer to the lower intermediate roller which acts to shorten the overall length of the belt path and reduce tension in the belt. Alternatively, retracting the length of the hydraulic linear actuator 84 serves to move the intermediate rollers farther apart which lengthens the overall belt path of the conveyor belt 12 to increase tension of the belt.

A hydraulic system shown in FIG. 15 and described in further detail below applies a controlled pressure of hydraulic fluid to the port at the inner end of the cylinder portion of the actuator acting to retract the actuator and increase tension to the belt.

The motor 52 is provided at a fixed location at an intermediate location along the length of the tube portion of the housing at the top side of the housing. The motor 52 includes a rotary output having an axis which is parallel to and spaced above the drive roller defined by the lower intermediate roller 50. A drive pulley 90 is mounted at one end of the drive roller for rotation together with the drive roller about an axis thereof. The drive pulley has a large diameter, for example which is more than five times the diameter of either one of the drive roller or the rotary output of the motor 52. A drive belt 92 extends about the rotary output of the motor and the pulley for transferring drive from the motor to the drive roller.

A tension assembly of the drive belt includes a tension crank 94 which is pivotally supported at a fixed location on the housing proximity to the rotary output. A tension roller 96 is rotatably supported on the tension crank at a location spaced from the pivot location of the crank on the housing. The tension roller has an axis of rotation parallel to the rotary output of the motor and has a peripheral surface located in close proximity to a imaginary tangent line extending between the rotary output and the drive pulley. In this manner pivoting of the crank 94 relative to the housing moves the tension roller 96 to engage the drive belt to redirect the belt path of the drive belt and in turn adjust the overall length of the drive belt path.

A hydraulic tension actuator 98, having a smaller diameter than the hydraulic linear actuator 84 that provides tension to the conveyor belt 12, is pivotally mounted at a cylinder end on the housing and pivotally mounted at a piston end at an intermediate location on the tension crank 94 spaced in between the pivot location of the crank on the housing and the axis of rotation of the tension roller on the crank. The controlled pressure from the hydraulic system of the conveyor can also be provided to the inner end of the cylinder portion of the actuator 98 to cause the actuator to retract and pull the tension wheel 96 further into the path of the drive belt for lengthening the drive belt path and increasing tension thereof.

Figure 15:
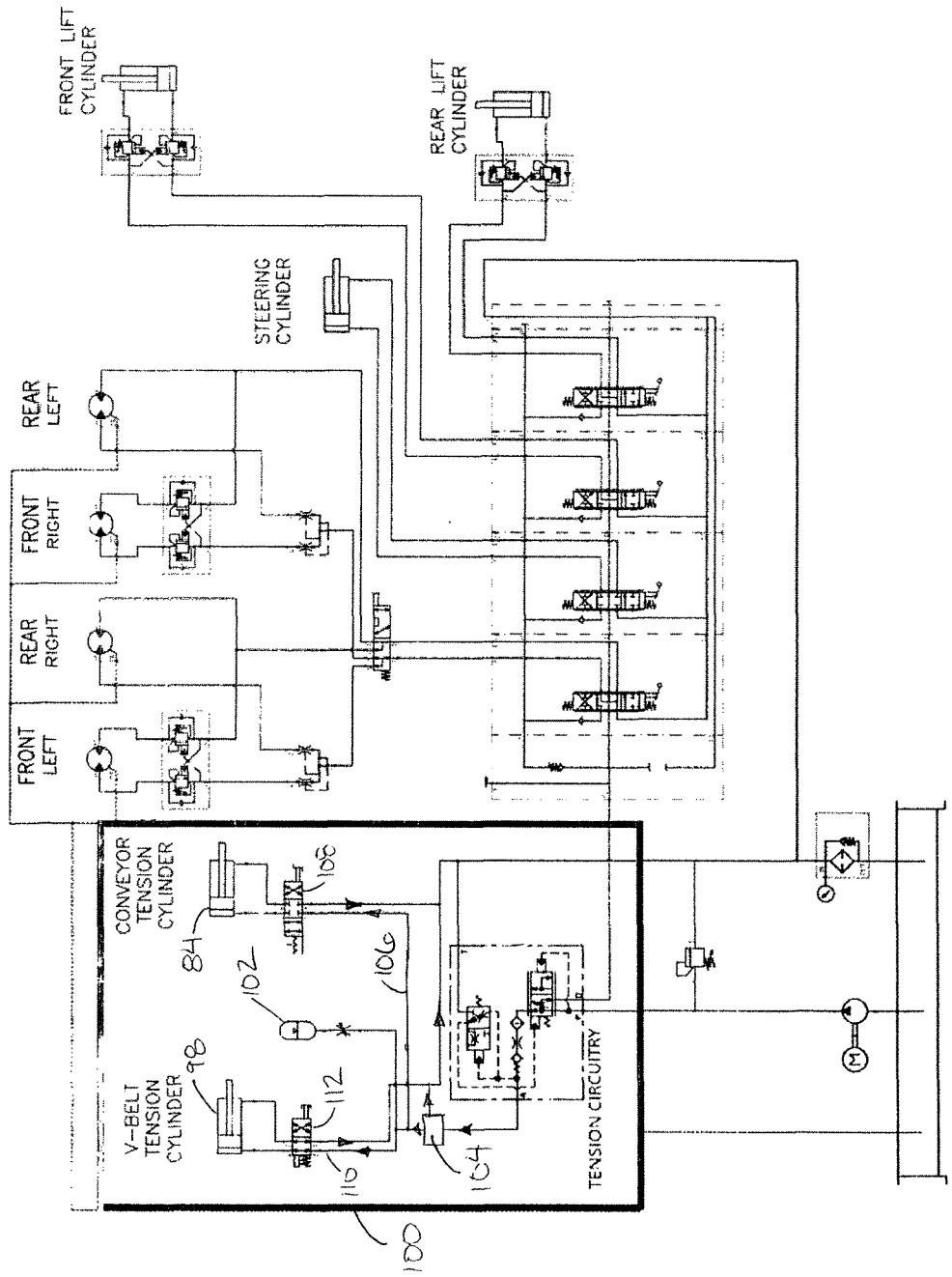
FIG. 15 is a schematic representation of a hydraulic system supplying hydraulic fluid to both the hydraulic actuator for tensioning the drive belt and the hydraulic actuator for tensioning the endless conveyor belt.

The hydraulic system of the conveyor includes various outputs and circuits represented schematically in FIG. 15 for operating various systems of the conveyor including raising and lowering of the conveyor or driving the conveyor across the ground for example. The hydraulic system further includes a tension control circuit 100 which includes a pressure reducing valve 104 that receives fluid from a pressurized supply of the hydraulic system and outputs hydraulic fluid at the defined controlled pressure supplied to both the hydraulic linear actuator 84 that applies tension to the conveyor belt 12 and the hydraulic tension actuator 98 at applies tension to the drive belt. An accumulator 102 for accumulating a volume of fluid therein to assist in stabilizing fluid pressure communicates with the output of the pressure reducing valve 104 of the tension control circuit.

Downstream of the pressure reducing valve 104, a first branch 106 of the hydraulic is directed towards a conveyor tension switch 108 having three positions for controlling the hydraulic linear actuator 84. In a retracting position, the controlled pressure is directed by the switch to the actuator 84 in a direction corresponding to increasing belt tension. In an extending position, the controlled pressure is directed by the switch to the actuator 84 in a direction corresponding to decreasing belt tension. In an off position, the controlled pressure is isolated from the actuator 84 by the switch to hold tension of the belt for a limited time. Due to the inevitable bleeding of some pressure from the actuator 84 in the off position of the switch, the off position corresponds to a gradual reduction of tension in the belt following the gradual reduction of active pressure applied to the hydraulic linear actuator 84.

A second branch 110 of the hydraulics downstream of the pressure reducing valve 104 is directed to a drive tension switch 112 having two positions. In a retracting position, the controlled pressure is directed by the switch 112 to the actuator 98 in a direction corresponding to increasing drive belt tension. In an extending position, the controlled pressure is directed by the switch 112 to the actuator 98 in a direction corresponding to decreasing drive belt tension.

When the conveyor 10 is not in use, the conveyor tension switch 108 is typically in the off position and the drive tension switch 112 is typically in the extended position. The motor 52 is typically first started up with no tension in the drive belt. The conveyor tension switch 108 is typically first displaced to the retracting position to apply the controlled pressure of hydraulic fluid to the actuator 84 which corresponds to a prescribed tension in the conveyor belt 12. To begin driving the rotation of the conveyor belt, the drive tension switch 112 is then displaced to the retracting position causing the actuator 98 to retract and increase tension within the drive belt. As the tension in the drive belt increases, the slippage between the drive belt and one or both of the rotating rotary output of the motor or the drive pulley gradually reduces as the drive belt and drive pulley catch up to the rotation speed of the rotary output of the motor. The increasing tension results in the drive pulley 98 gradually being brought up to speed. The slippage of the drive belt and the somewhat gradual buildup of speed of the drive pulley 90 allows the conveyor belt to start rotating with minimal slippage between the conveyor belt 12 and the drive roller of the belt positioning system. At maximum drive belt tension, there is no further slippage and the drive belt is fully engaged between the rotary output of the motor and the drive pulley. The start up procedure as outlined results in any belt slippage more likely occurring between the drive belt and the rotary output of the motor and/or drive pulley while minimizing slippage of the endless conveyor belt 12 relative to the drive roller 50. This is preferable as the drive belt is cheaper and simpler to replace than the conveyor belt.

The hydraulic actuator 84 for tensioning the conveyor belt 12 is advantageous as the simple flip of a hydraulic switch or the simple shutting down of the hydraulic system is sufficient for the tension in the belt to be reduced to minimal or no tension during long-term storage which increases the overall life of the conveyor belt 12. With continued use, as the conveyor belt stretches over time, the application of a controlled pressure to the actuator 84 causes the actuator to be automatically displaced to take up the stretch in the belt and maintain the tension in the conveyor belt at a corresponding setpoint tension.

By applying a common controlled pressure to both actuators, the tension in the drive belt is proportional to the tension in the conveyor belt. By selecting different diameter actuators for the actuator 84 and the actuator 98, the proportional difference between the tension of the drive belt and the tension in the endless conveyor belt can be adjusted.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. An agricultural conveyor comprising:
   a main frame supported on wheels for rolling movement across a ground surface;
   a housing supported on the main frame, the housing including (i) a tube portion extending in a longitudinal direction at an upward slope from an inlet end of the tube portion to an outlet end of the tube portion and (ii) a pickup portion connected to the inlet end having an open top end;
   an endless conveyor belt received within the housing to define an upper run of the endless conveyor belt and a lower run of the endless conveyor belt below the upper run;
   a belt positioning assembly supporting the endless conveyor belt to convey material from the open top end of the pickup portion of the housing to the outlet end of the tube portion of the housing, the belt positioning assembly comprising:
   (i) pickup rollers supported in the pickup portion of the housing;
   (ii) conveyor rollers supported at opposing ends of the tube portion of the housing;
   (iii) an upper intermediate roller supported below the upper run of the endless conveyor belt so as to be positioned between the inlet end and the outlet end of the tube portion in the longitudinal direction; and
   (iv) a lower intermediate roller supported below the upper run of the endless convey so as to be positioned between the inlet end of the tube portion and the upper intermediate roller in the longitudinal direction;
   the upper run of the endless conveyor belt comprising a first upper belt portion spanning below the open top end between the pickup rollers within the pickup portion of the housing and a second upper belt portion extending through the tube portion of the housing from the inlet end to the outlet end between the conveyor rollers;
   the lower run of the endless conveyor belt comprising a first lower belt portion extending from the outlet end of the tube portion to the lower intermediate roller, a second lower belt portion extending between the lower intermediate roller and the upper intermediate roller, and a third lower belt portion extending from the upper intermediate roller to the pickup rollers within the pickup portion of the housing;
   the belt positioning assembly further comprising a track on the tube portion of the housing extending in the longitudinal direction of the tube portion and a carriage mounted on the track so as to be slidable along the track in the longitudinal direction of the tube portion;
   one of the upper intermediate roller and the lower intermediate roller comprising a fixed roller being fixed in position relative to the tube portion of the housing;
   one of the upper intermediate roller and the lower intermediate roller comprising a tensioning roller supported on the carriage so as to be movable with the carriage in the longitudinal direction relative to the tube portion of the housing;
   a hydraulic linear actuator operatively connected between the housing and the carriage such that extension and contraction of the hydraulic linear actuator displaces the tension roller on the carriage relative to the housing so as to vary a length of a path of the endless conveyor belt defined by the belt positioning system; and
   a hydraulic controller operatively connected to the hydraulic linear actuator so as to be arranged to supply a controlled pressure of hydraulic fluid to the hydraulic linear actuator corresponding to a prescribed tension of the endless conveyor belt.

2. The conveyor according to claim 1 wherein the hydraulic linear actuator is parallel to and lies in a common vertical plane with the longitudinal direction of the tube portion of the housing.

3. The conveyor according to claim 1 wherein the controller pressure of the hydraulic controller is controllably adjustable.

4. The conveyor according to claim 1 further comprising a hydraulic switch operatively connected to the hydraulic linear actuator to be operable between a working position in which the hydraulic linear actuator is supplied with hydraulic fluid at the controlled pressure of the hydraulic controller and a storage position in which the hydraulic linear actuator is isolated from the controlled pressure of the hydraulic controller corresponding to a release of the prescribed tension on the endless conveyor belt.

5. The conveyor according to claim 1 wherein the lower intermediate roller is the fixed roller and the upper intermediate roller is the tensioning roller.

6. The conveyor according to claim 5 wherein the hydraulic linear actuator is mounted between the upper intermediate roller and the outlet end of the tube portion of the housing such that contraction of the hydraulic linear actuator increases tension on the endless conveyor belt.

7. The conveyor according to claim 1 wherein one of the rollers comprises a drive roller which is operatively connected which is operatively connected to a drive motor so as to drive rotation of the endless conveyor belt about the rollers.

8. The conveyor according to claim 7 wherein the fixed roller is the drive roller.

9. The conveyor according to claim 7 further comprising a drive pulley connected to the drive roller for rotation together about an axis of the drive roller, a drive belt coupled between a rotary output of the drive motor and the drive pulley to transfer rotation from the rotary output of the drive motor to the drive roller connected to the drive pulley, a tension wheel engaging the drive belt and supported on the housing so as to be movable relative to the housing to vary tension applied to the drive belt, and a hydraulic tension actuator operatively connected between the housing and the tension wheel so as to be arranged to controllably adjust the tension applied to the drive belt.

10. The conveyor according to claim 1 wherein the hydraulic controller is operatively connected to both the hydraulic linear actuator that is operatively connected to the endless conveyor belt and the hydraulic tension actuator that is operatively connected to the drive belt such that the prescribed tension of the endless conveyor belt is proportional to the tension applied to the drive belt.

11. The conveyor according to claim 10 wherein the hydraulic controller includes a pressure reducing valve and wherein both the hydraulic linear actuator and the hydraulic tension actuator are connected downstream of said pressure reducing valve.

12. The conveyor according to claim 1 wherein the track comprises two elongated channel members parallel to the longitudinal direction of the tube portion and spaced laterally apart from one another, the carriage spanning between the channel members such that opposing side edges of the carriage are received within the elongated channel members respectively so as to be slidable in the longitudinal direction of the tube portion of the housing.

13. The conveyor according to claim 12 wherein each elongated channel member is U-shaped in cross section, having an open side facing laterally inwardly towards the other channel member.

14. The conveyor according to claim 12 wherein each side edge of the carriage includes a pair of sliding members which are spaced apart in the longitudinal direction and which are formed of a sliding material having a low coefficient of friction.

15. The conveyor according to claim 12 wherein each side edge of the carriage includes a pair of sliding members defining opposing top and bottom sliding surfaces that are parallel to one another and which are in sliding contact with respective surfaces on the track.

16. An agricultural conveyor comprising:
a main frame supported on wheels for rolling movement across a ground surface;
a housing supported on the main frame, the housing including (i) a tube portion extending in a longitudinal direction at an upward slope from an inlet end of the tube portion to an outlet end of the tube portion and (ii) a pickup portion connected to the inlet end having an open top end;
an endless conveyor belt received within the housing to define an upper run of the endless conveyor belt and a lower run of the endless conveyor belt below the upper run;
a belt positioning assembly comprising a plurality of conveyor rollers supporting the endless conveyor belt to convey material from the open top end of the pickup portion of the housing to the outlet end of the tube portion of the housing;
a drive motor having a rotary output;
one of the conveyor rollers comprising a drive roller;
a drive pulley connected to the drive roller for rotation together about an axis of the drive roller;
a drive belt coupled between the rotary output of the drive motor and the drive pulley to transfer rotation from the rotary output of the drive motor to the drive roller connected to the drive pulley;
a tension wheel engaging the drive belt and supported on the housing so as to be movable relative to the housing to vary tension applied to the drive belt;
a hydraulic tension actuator operatively connected between the housing and the tension wheel such that extension and contraction of the hydraulic tension actuator displaces the tension wheel to vary a length of a path of the drive belt;
a hydraulic controller operatively connected to the hydraulic tension actuator so as to be arranged to supply a controlled pressure of hydraulic fluid to the hydraulic linear actuator corresponding to a prescribed tension of the drive belt; and
a tension crank pivotally supported at a fixed pivot location on the housing, the tension wheel being rotatably supported on the tension crank at a location spaced from the fixed pivot location, and the hydraulic tension actuator being pivotally coupled to the tension crank at a location spaced from the fixed pivot location such that extension and contraction of the hydraulic tension actuator pivots the tension crank to displace the tension wheel and vary a length of a path of the drive belt.

17. The conveyor according to claim 16 further comprising a hydraulic switch operatively connected to the hydraulic tension actuator to be operable between a working position in which the hydraulic tension actuator is supplied with hydraulic fluid at the controlled pressure of the hydraulic controller to cause the hydraulic tension actuator to apply tension to the drive belt and an idle position corresponding to a release of the prescribed tension on the drive belt.

18. An agricultural conveyor comprising:
a main frame supported on wheels for rolling movement across a ground surface;
a housing supported on the main frame, the housing including (i) a tube portion extending in a longitudinal direction at an upward slope from an inlet end of the tube portion to an outlet end of the tube portion and (ii) a pickup portion connected to the inlet end having an open top end;

an endless conveyor belt received within the housing to define an upper run of the endless conveyor belt and a lower run of the endless conveyor belt below the upper run;

a belt positioning assembly comprising a plurality of conveyor rollers supporting the endless conveyor belt to convey material from the open top end of the pickup portion of the housing to the outlet end of the tube portion of the housing;

a drive motor having a rotary output;

one of the conveyor rollers comprising a drive roller;

a drive pulley connected to the drive roller for rotation together about an axis of the drive roller;

a drive belt coupled between the rotary output of the drive motor and the drive pulley to transfer rotation from the rotary output of the drive motor to the drive roller connected to the drive pulley;

a tension wheel engaging the drive belt and supported on the housing so as to be movable relative to the housing to vary tension applied to the drive belt;

a hydraulic tension actuator operatively connected between the housing and the tension wheel such that extension and contraction of the hydraulic tension actuator displaces the tension wheel to vary a length of a path of the drive belt;

a hydraulic controller operatively connected to the hydraulic tension actuator so as to be arranged to supply a controlled pressure of hydraulic fluid to the hydraulic linear actuator corresponding to a prescribed tension of the drive belt; and wherein one of the conveyor rollers is a tension roller;

wherein a hydraulic linear actuator is operatively connected between the housing and the tension roller such that extension and contraction of the hydraulic linear actuator displaces the tension roller relative to the housing such that a pressure of the hydraulic linear actuator corresponds to a prescribed tension of the endless conveyor belt; and wherein the hydraulic controller is operatively connected to both the hydraulic linear actuator that controls tension of the endless conveyor belt and the hydraulic tension actuator that controls tension of the drive belt such that the prescribed tension of the endless conveyor belt is proportional to the tension applied to the drive belt; and the hydraulic controller includes a pressure reducing valve in which both the hydraulic linear actuator and the hydraulic tension actuator are connected downstream of said pressure reducing valve.

* * * * *